(12) United States Patent
Farb et al.

(10) Patent No.: US 12,116,980 B2
(45) Date of Patent: Oct. 15, 2024

(54) COUPLING SYSTEM FOR COUPLING A CURVED OBJECT TO A CENTRAL SHAFT

(71) Applicant: Flower Turbines INC., Lawrence, NY (US)

(72) Inventors: Mark Daniel Farb, Lawrence, NY (US); Irakli Baitish, Haifa (IL); Arthur Bayzer, Huntersville, NC (US)

(*) Notice: Subject to any disclaimer, the term of this patent is extended or adjusted under 35 U.S.C. 154(b) by 7 days.

(21) Appl. No.: 17/758,353

(22) PCT Filed: May 11, 2021

(86) PCT No.: PCT/US2021/031856
§ 371 (c)(1),
(2) Date: Jul. 4, 2022

(87) PCT Pub. No.: WO2021/231485
PCT Pub. Date: Nov. 18, 2021

(65) Prior Publication Data
US 2023/0014381 A1 Jan. 19, 2023

Related U.S. Application Data

(60) Provisional application No. 63/023,969, filed on May 13, 2020.

(51) Int. Cl.
*F03D 3/06* (2006.01)
*F16B 37/04* (2006.01)

(52) U.S. Cl.
CPC ............ *F03D 3/064* (2013.01); *F16B 37/048* (2013.01)

(58) Field of Classification Search
CPC .................................................... F03D 3/064
See application file for complete search history.

(56) References Cited

U.S. PATENT DOCUMENTS

2011/0311364 A1* 12/2011 Conner .................. F03D 3/061
416/243

FOREIGN PATENT DOCUMENTS

| KR | 101592289 B1 | 2/2016 |
|---|---|---|
| WO | 2020060063 A1 | 3/2020 |

OTHER PUBLICATIONS

ISR; Israel Patent Office; Aug. 22, 2021.

* cited by examiner

*Primary Examiner* — Kyle A Cook
(74) *Attorney, Agent, or Firm* — Patshegen IP; Moshe Pinchas

(57) ABSTRACT

A coupling system for coupling a curved object to a central shaft, the curved object includes an inner surface facing the central shaft and an outer surface. The system includes a coupling member for coupling the curved object to the central shaft; at least one pocket integrally formed on a curved surface of the curved object and defined as a depression with respect to at least one of the inner and outer surfaces. The pocket includes: a flat portion having an aperture for holding the coupling member; and a flange portion which merges continuously from the flat portion to the curved object and is shaped such that the flat portion is disposed perpendicularly to the coupling member; a fastening member for fastening the coupling member to the flat portion. The thickness of the flat portion and flange portion is the thickness of the curved object.

9 Claims, 16 Drawing Sheets

COUPLING SYSTEM FOR COUPLING A CURVED OBJECT TO A CENTRAL SHAFT

This patent application claims the benefit of U.S. Provisional Patent Application No. 63/023,969, entitled Provisional 5-20 Vertical Axis Wind Turbine Blade Connections, filed May 13, 2020.

BACKGROUND OF THE INVENTION

The present invention relates to solving the problem of attaching a curved structure, usually but not necessarily made of plastic or composites, to another curved structure, in the usual embodiment a shaft. The main application foreseen here is to small wind turbines but it applies to other combinations of curved structures.

Related Art

Not applicable.

BRIEF SUMMARY OF THE INVENTION

The present invention successfully addresses the shortcomings of the presently known configurations by providing a better connection between the shaft and the curved structure.

It is now disclosed for the first time a coupling system for coupling a curved object to a central shaft, the curved object includes an inner surface facing the central shaft and an outer surface, the system comprising:
  a coupling member for coupling the curved object to the central shaft;
  at least one pocket integrally formed on a curved surface of the curved object and defined as a depression with respect to at least one of the inner and outer surfaces, the pocket includes:
  a flat portion having an aperture for holding said coupling member; and
  a flange portion which merges continuously from the flat portion to the curved object and is shaped such that said flat portion is disposed perpendicularly to the coupling member;
  a fastening member for fastening the coupling member to the flat portion;
  wherein the thickness of the flat portion and flange portion is the thickness of the curved object.

According to another embodiment, the coupling member is a rod coupled on a first end thereof to the central shaft and on a second end thereof to the curved object.

The system of claim 1, wherein the coupling member includes a bolt member disposed in the aperture, and a rod coupled on a first end thereof to the central shaft and on a second end thereof to the bolt member.

According to another embodiment, the fastening member includes a least one washer and a nut and wherein the flat portion is configured to allow the washer and the nut to rest on the flat portion.

According to another embodiment, a first nubbin of the flange portion protrudes from the outer surface of the curved object and a second nubbin of the flange portion protrudes from the inner surface of the curved object and wherein the flat portion 32 extends between the outer surface and the inner surface.

According to another embodiment, the flange portion protrudes from the inner surface 10a of the curved object and wherein the flat portion extends outside the inner surface.

According to another embodiment, the first section of the flange portion includes a curvature which includes aerodynamic properties configured to conform with the aerodynamic properties of the curved surface.

According to another embodiment, the first section of the flange portion includes a curvature which is configured with a smooth transition with respect to curvature of the curved surface.

According to another embodiment, the curved object is a wind turbine blade, and wherein the central shaft is configured to be rotated by the wind turbine blade.

It is now disclosed for the first time a wind turbine blade for coupling to a central shaft with a plurality of coupling members, the wind turbine blade comprising:
  an inner surface facing the central shaft and an outer surface;
  a plurality of pockets integrally formed on curved surfaces of the blade and defined as a depression with respect to at least one of the inner and outer surfaces, and being configured for holding one of the coupling members, the pocket includes:
  a flat portion having an aperture for holding one of the coupling members; and
  a flange portion which couples the flat portion to the curved surface and is shaped such that the flat portion is disposed in perpendicular to the coupling member;
  a fastening member for fastening the coupling member to the flat portion;
  wherein the thickness of the flat portion and flange portion is at least the thickness of the curved object.

BRIEF DESCRIPTION OF SEVERAL VIEWS OF THE DRAWINGS

The invention is herein described, by way of example only, with reference to the accompanying drawings, wherein.

DETAILED DESCRIPTION OF THE INVENTION

The present invention presents better ways to attached curved objects to central shafts.

Identification of terms in the figures:
Curved object or blade: 21
Central shaft: 51
Pocket: 60
Hole in the pocket: 44, 54
Coupling member, which is what goes through the hole in the pocket: 24 or 70
Bighead: a coupling member that passes through the hole and has a stop on one side, meaning that the coupling member and fastening member will be part of one structure on the inside of the curved object: 70
Flange portion: 22 or 23, 56
Fastening member, in some cases it can be a truss, which is what holds the coupling member to the structure of shaft and curved object: 25, 26, 27, or 53

The principles and operation of a curved object attached to a shaft according to the present invention may be better understood with reference to the drawings and the accompanying description.

Figure 1:
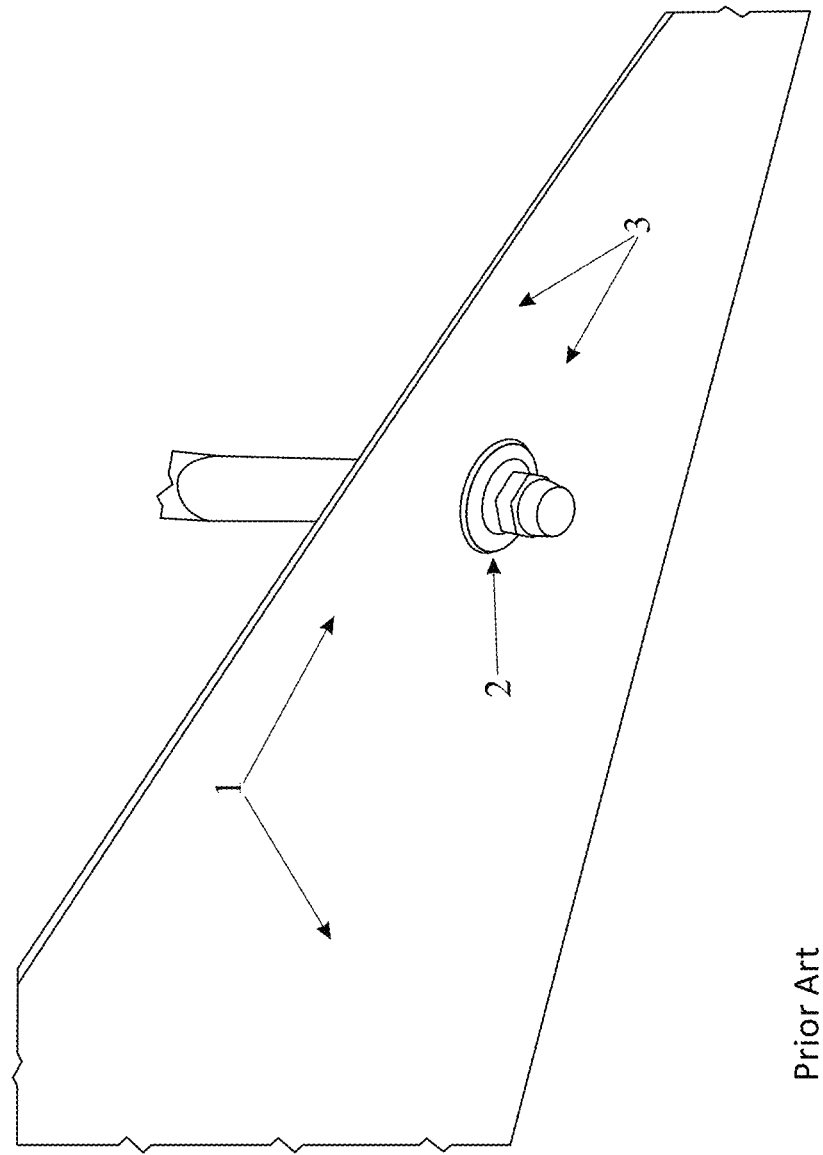
FIG. 1 is a diagram of a prior art blade and connection
Figure 2:
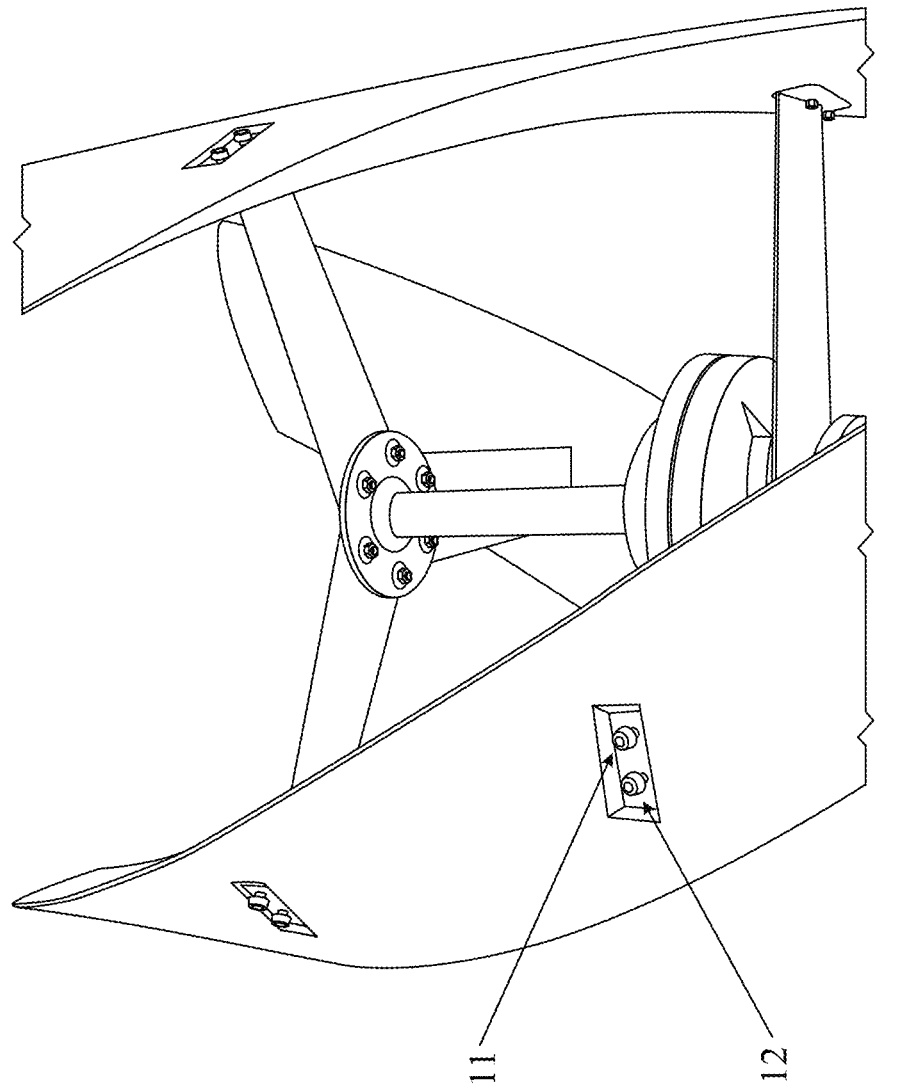
FIG. 2 is a diagram of a prior art blade and connection.
Figure 3:
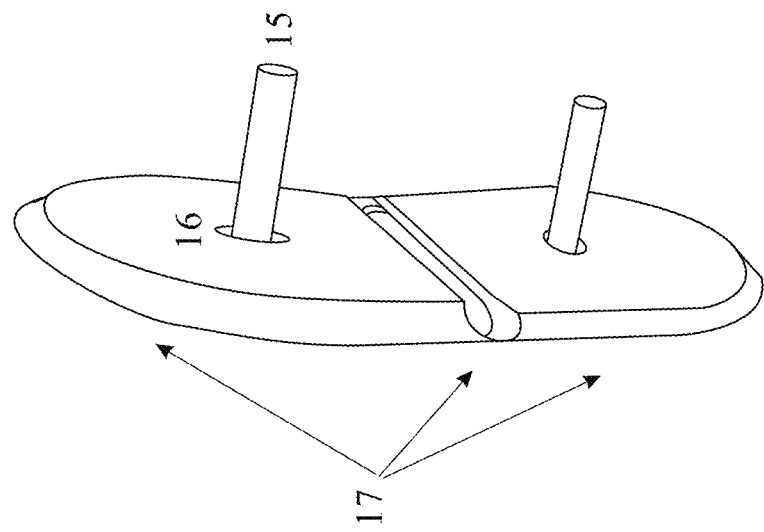
FIG. 3 is a diagram of a prior art bighead laminated onto a blade.

Referring now to the drawings, FIGS. 1-3 illustrate problematic products based on current art.

Problem

In a small vertical axis turbine, there are a few ways to connect the blades to the rotating shaft. One is an internal attachment to the inner aspect of the blades with various kinds of struts only attached to the insides. FIG. 3 is a prior art example of this where bolts are placed from a strut (also called an arm or flange) using bolts from the inside into unequal thick areas of the blades. This makes sense for certain small turbines but tends to be bulkier and take up more space. They may also involve more labor, for example, to connect fiberglass to the inside of the blades.

An inexpensive alternative is to connect bars or rods to the blades to the sides of or through a hole in the central shaft. The problem is that these blades are circular and it is difficult to attach them perpendicularly to the shaft.

FIG. 1 shows that solution, simply attaching a rod, washer, and nut (2) at right angles to the curved blades (1). The result of this mismatch between the straight perpendicular force of the rod and its attachments with curved blades can result in folds (3) that break the blades, usually within a few years. We bought one of these to verify the poor design.

FIG. 2 shows another prior art solution. A straight interface (12) is depressed from the blade surface, probably made in a mold, which enables the rods and nuts (11) to connect in such a way that no folds are created. (Note that a rod is not necessarily cylindrical in shape.) The disadvantage here is that it creates weak spots in the blades because an area of decreased thickness is adjacent to a thicker area. It is well known that a consistent and adequate thickness helps resist high forces from high winds so the blade doesn't break from the stress on the areas of lesser thickness, and the connection is always a location of high stress. However, this general principle has generally been ignored for the sake of convenient attachment.

FIG. 3 shows another type of prior art, common among composite blades. Here bigheads (15), a usually metal part that looks like a thumbtack but is wider and thicker (FIG. 15, 70), attach on one side to the inside only of the blade, that is, attached to the inner surface, and are laminated (16) on top of the inner surface of the blade at an interface (17) where there is a clear area of weakness prone to breaking off at high rpm. On the other side the bigheads are attached to a coupling member that attaches them to the shaft. Thus, they change the thickness of an existing blade on the inside only and present a surface that leads to a concern about them breaking off in high winds. They are also based on the curve of the inner side of the blade so that additional material prone to being stripped off fills in the gap in the mismatch between the shape of the bighead and the curve of the blade. Another disadvantage is that they prevent close stacking of the blades for shipping. Another disadvantage is that they are harder to assemble on site.

These prior art solutions using rods and unequally sized thicknesses make the blades substantially less durable than they could be.

Solution

The applicant proposes a novel approach that maintains the thickness of the blades at the connection interface and provides a perpendicular surface for the rod or other connecting piece attachment, thereby addressing the deficiencies of the current methods of using rods. They also are present on the outside and inside of the blade.

This solution is applicable in many contexts, but the most common one envisaged is wind turbine blades and shafts, so that language is sometimes used without excluding other applications.

In summary, the innovation consists of a combination of features, of which the prior art may have made use of less than the full solution:

1. Rods or connecting pieces extend from outside to inside. Referred to as "coupling members" also. One might also call it a "truss" in certain circumstances.
2. The rods or flanges sit inside a pocket in the blades and connect through a hole or aperture.
3. The pockets have a base that is perpendicular to the piece connecting to the shaft.
4. Thickness of the material, usually plastic or composite or a combination of metal and plastic, is substantially maintained continuously and smoothly in the area of the pocket.
5. Minimal effect on the outer or inner curvature of the blade.

Figure 4:
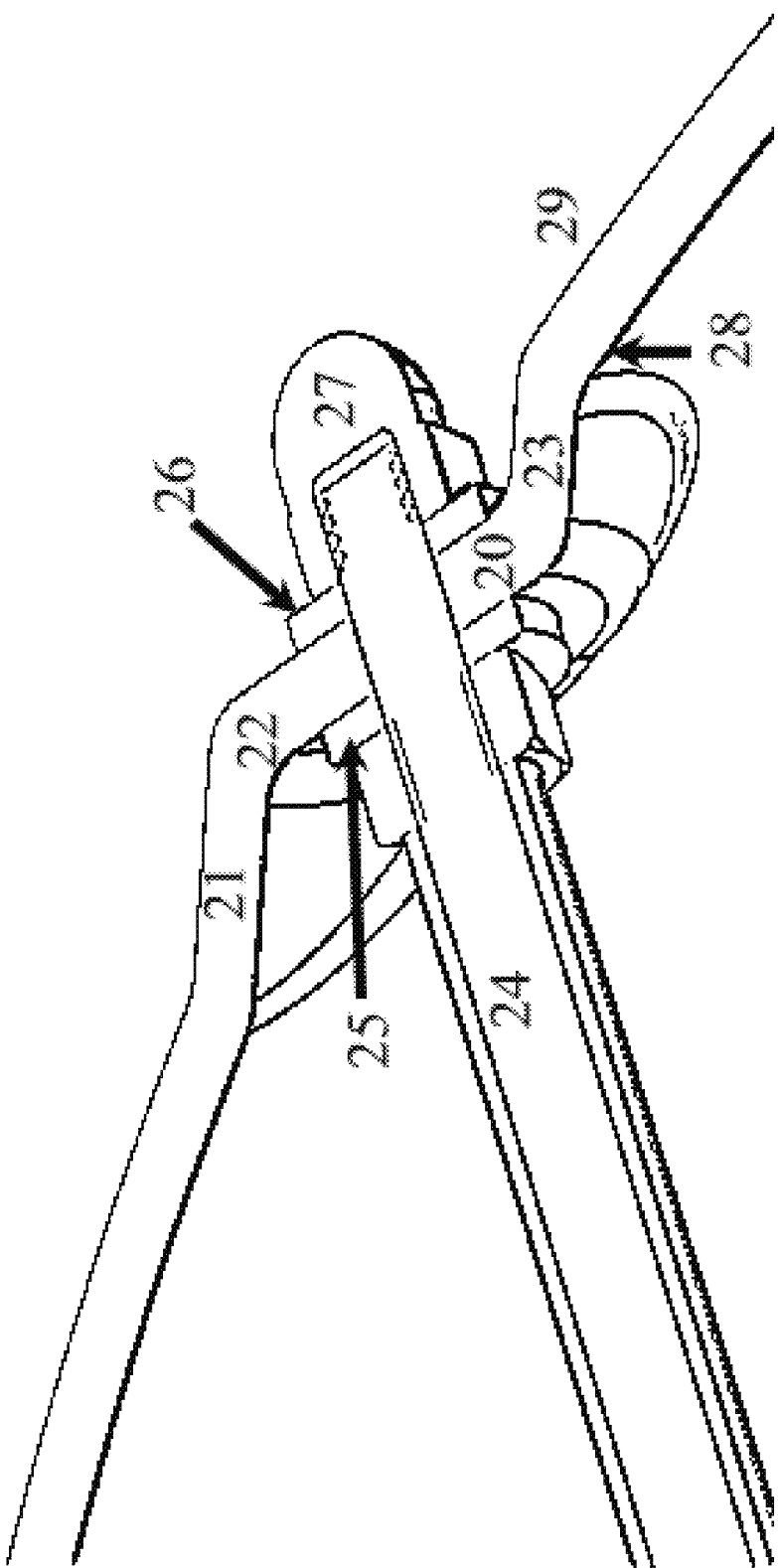
FIG. 4 is a diagram of a pocket and rod.

FIG. 4 shows the blade (21) in cross-section. The blade has an inner (28) and outer surface (29). As it approaches the interface for the rod insertion, it changes course to form an outer nubbin that curves and bulges on the front surface of the blade (22) at the edge of the interface ("flange portion") with the flat portion (20) while maintaining the same thickness. It then proceeds straight in a plane perpendicular to the rod (24), which is a coupling member, and that coupling member attaches to the collection of structures referred to collectively as "fastening member", in this case, washers (25, 26), and nut (27) that connect the blade to the shaft via the coupling member (24). In this embodiment, (26) is a washer which fills the pocket, which is seen as a depression in the outer surface of the blade and extends from the flange portion of 22 to 23. Then the blade forms an inner nubbin or protrusion (where 20 meets 23) that slightly bulges to the inside of the blade so that the remainder of the blade resumes the curvature of the surrounding blade without sacrificing the thickness and strength of the blade. (22) is approximately the same thickness as (23), and at (23) the blades resume a similar curvature to what it had at (21). (22) and (23) together form a base for the washers and rod to attach inside a pocket. Note that in this embodiment, the outer and inner nubbins are approximately balanced.

A mold for use with plastic and composites is the ideal way to make this blade and interface. A mold with the characteristics described is also included in the invention.

Figure 5:
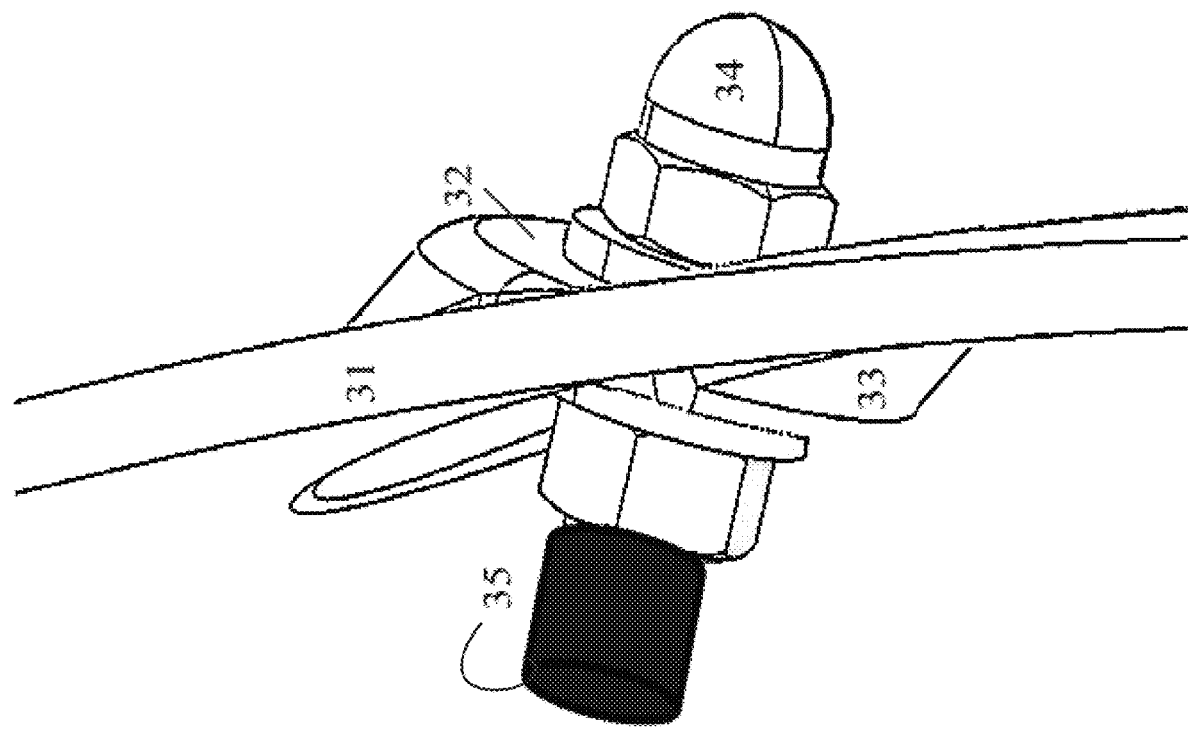
FIG. 5 is a diagram of a different perspective on a pocket and rod shown in FIG. 4.

FIG. 5 is a different view of and a cross-section of the blade immediately adjacent to the interface changes shown in FIG. 4. The blade (31) adjacent to the rod (35) and outer and inner protrusions (32, 33) is completely smooth and continuous without any folds or changes in thickness. One can easily see that the outer protrusion (32) deflects the oncoming air, which provides resistance to the revolution of the leading edge of the blade, over the nut (34) so there is minimal aerodynamic interference from the nut sticking out.

Figure 6:
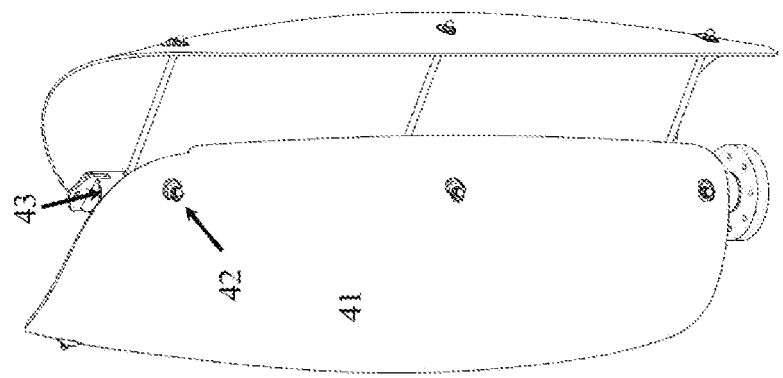
FIG. 6 is a diagram of a wind turbine.
Figure 10:
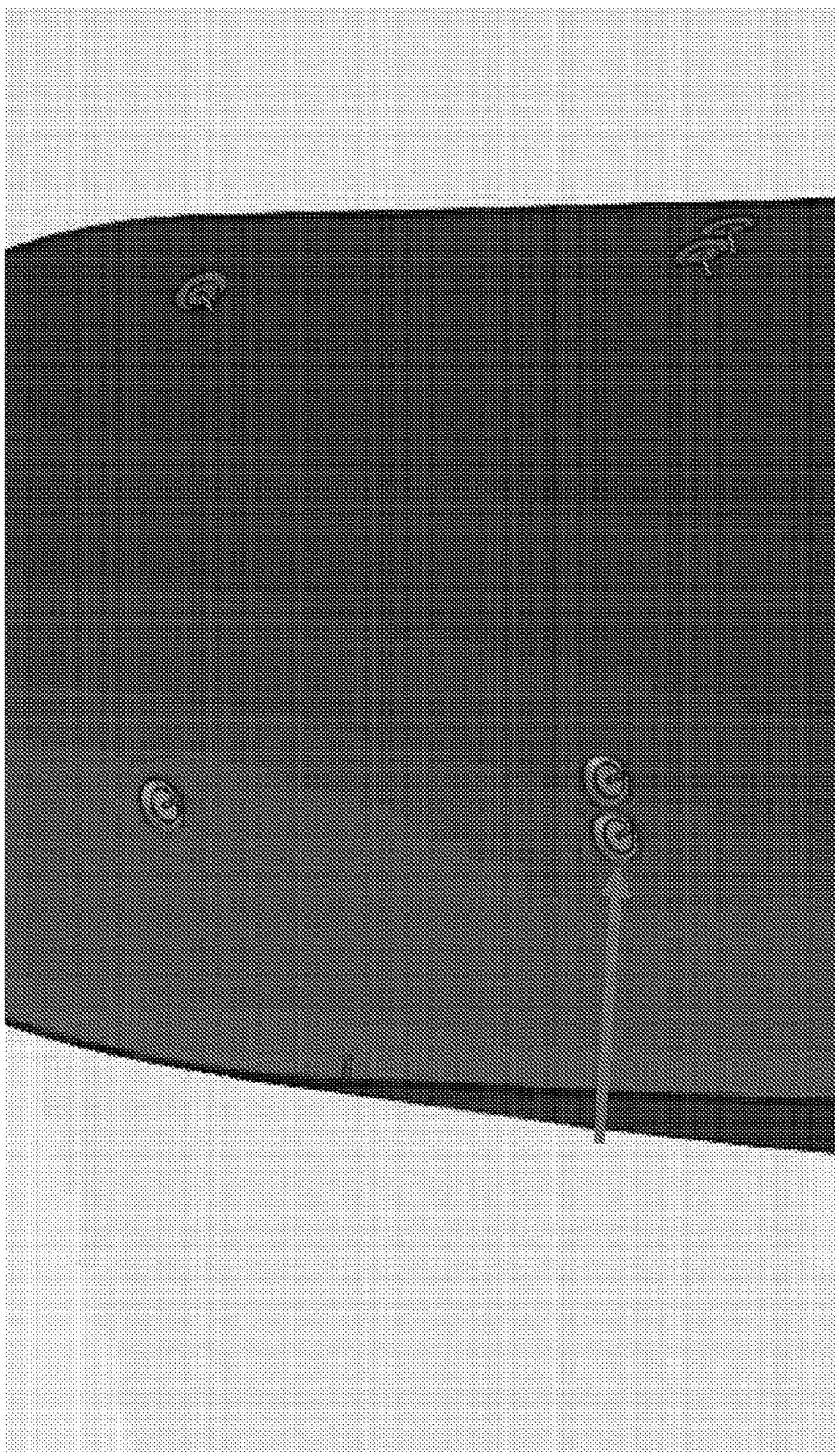
FIG. 10 is a diagram of a blade with bigheads in a pocket.
Figure 11:
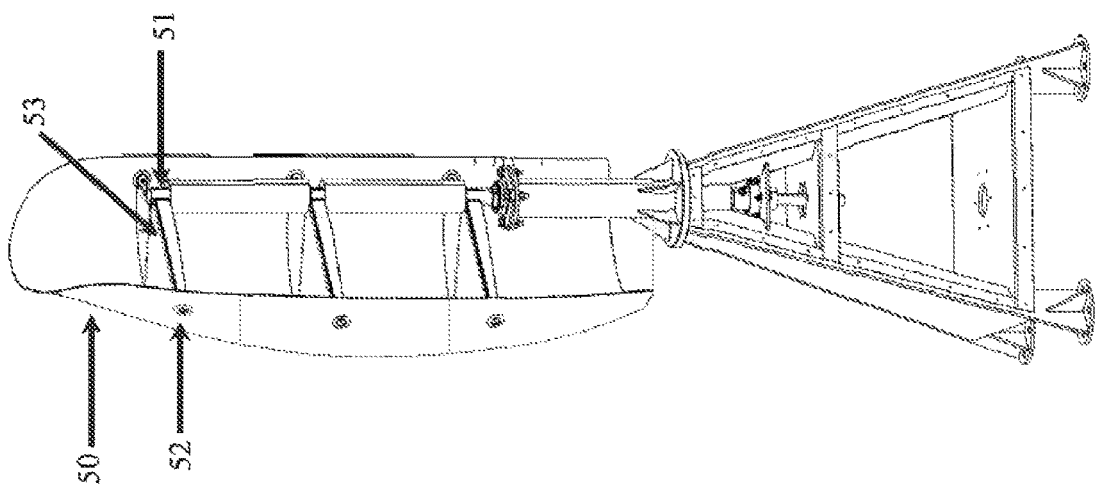
FIG. 11 is a diagram of a turbine with one blade attached.

FIG. 6 shows how it is implemented on blades produced by the applicant's team. The blade (41) has rods and nubbins (42) that attach to and pass through a central shaft (43). FIG. 10 is a drawing of the pocket from the inside. FIG. 11 is a drawing of the pocket from the outside. Part of what one should pay attention to is the base for the rod that is perpendicular to the shaft.

The novel shape of the blade with the nubbins can be produced by making a mold with these features.

The result is a more durable, low-cost, and easy to assemble set of turbine blades.

The invention could be used on an asymmetrical number of blades, wherein the rod connects to one side of the shaft on one end and the blade on the other. The ideal embodiment is for a symmetrical, even number of blades, where the rod (which can comprise several pieces) extends through a hole on each side of the shaft, to which it is fixedly attached to an interface of each blade on the two far sides of the rod.

Figure 7:
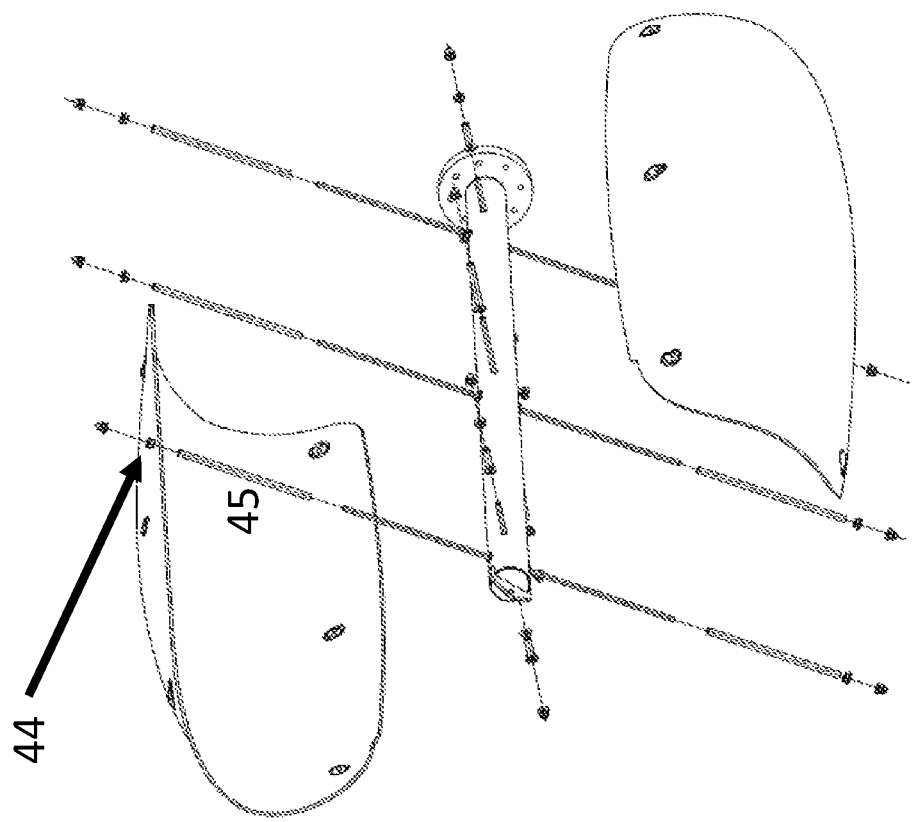
FIG. 7 is a diagram of a disconnected rod and pocket system.
Figure 8:
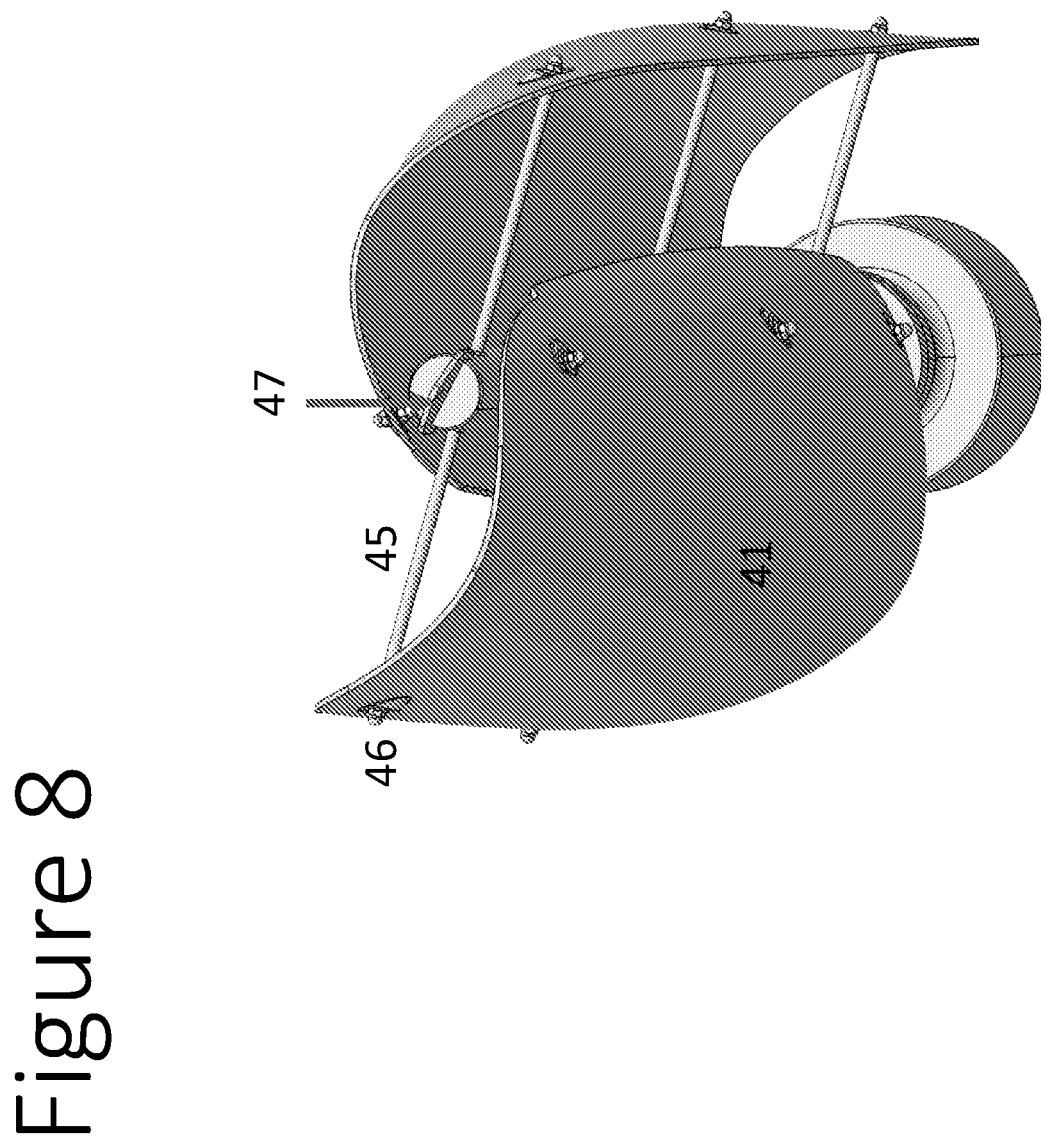
FIG. 8 is a diagram of a wind turbine from an angle
Figure 9:
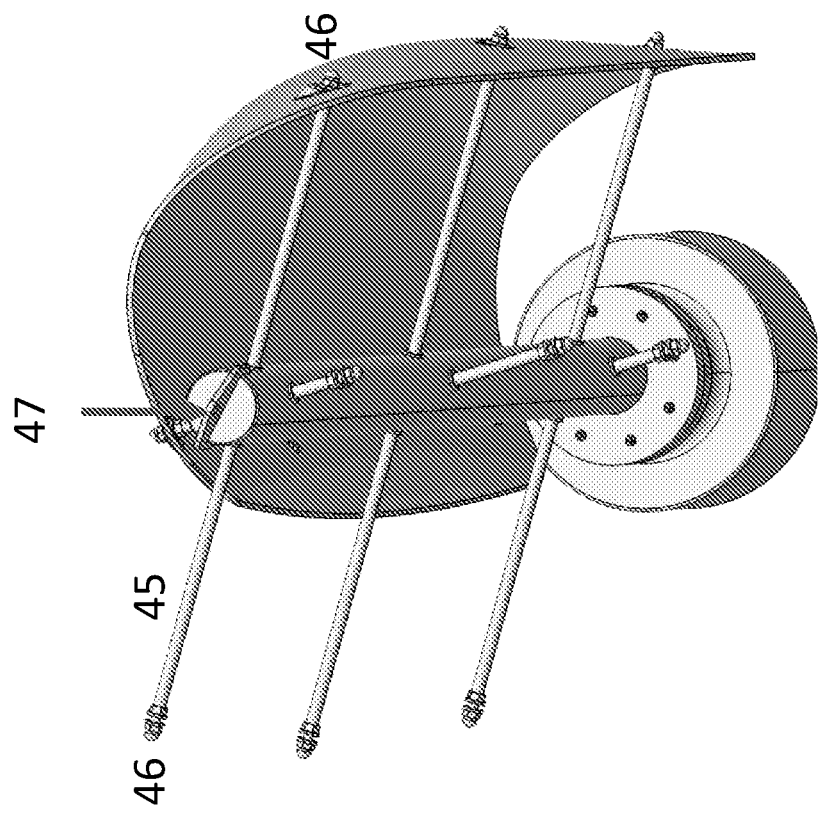
FIG. 9 is a diagram of a wind turbine from a different angle.

The rod (or coupling member) is not necessarily a single piece. It can comprise a group of pieces that make up the rod, as in the exploded view of FIG. 7, for a turbine with two blades and the rod (45) passing through a hole (44) in the shaft. FIG. 8 is a three-dimensional view of how the whole turbine of FIGS. 6 and 7 would look. The turbine includes a shaft (47), and a blade (41) which is coupled to the shaft by a coupling member (45) and a fastening member (46). FIG. 9 gives another view of a shaft (47), a coupling member (45) and a fastening member (46).

Now we will consider the related solution to the related problem shown in FIG. 3.

Figure 15:
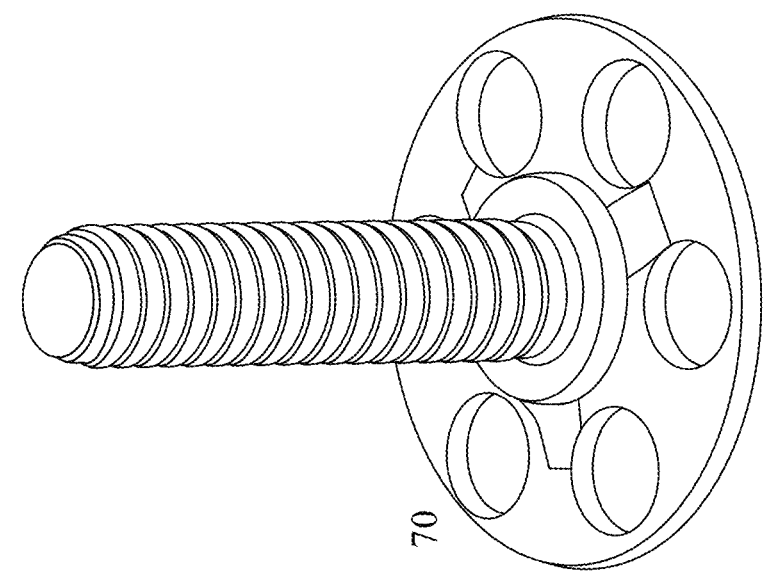
FIG. 15 is a diagram of a bighead.

FIG. 10 gives the big picture first. It shows a blade with bigheads (49) on the blade with their part for connecting to a coupling member pointing inwards. FIG. 15 is a photo of a bighead (70).

FIG. 11 also shows the big picture with a section of a turbine and its blade. (50) is the blade, (51) is the shaft, (52) is the fastening member, the head of the bighead, inserted into a pocket in the blade, and (53) is the coupling member or truss. Not shown as additional fastening members would be any additional screws or washers required to attach the coupling member to the fastening members.

Figure 12:
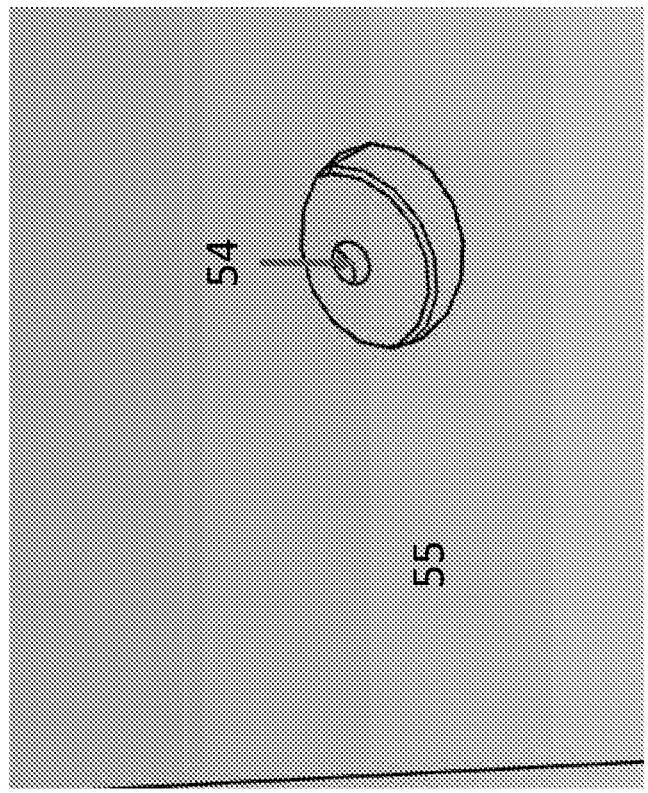
FIG. 12 is a diagram of a big head pocket from the outside.
Figure 13:
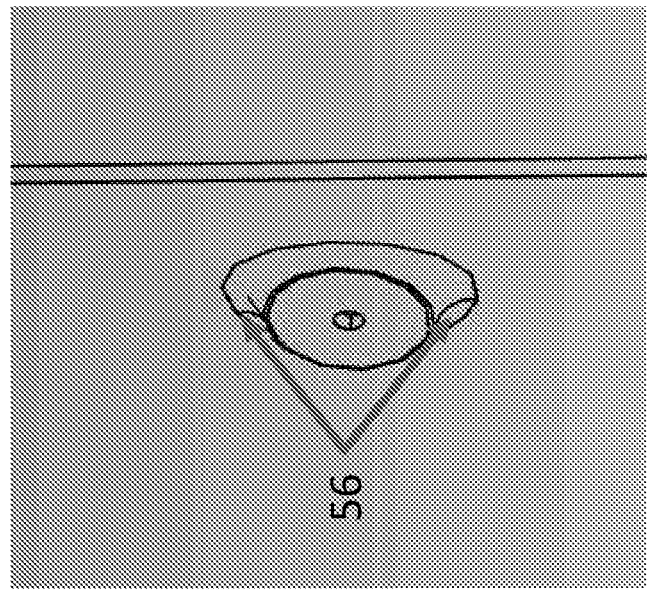
FIG. 13 is a diagram of a big head pocket on the inside of the blade.

FIG. 12 shows the bighead pocket (54) as a depression on the outside (55) of the blade. FIG. 13 shows the bighead pocket connected to the flange portion as a protrusion (56) on the inside of the blade of FIG. 12.

Figure 14:
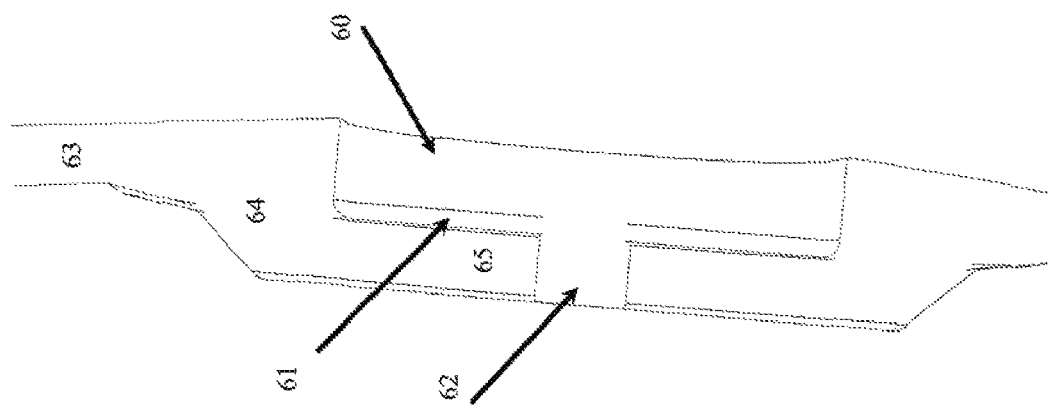
FIG. 14 is a diagram of a cross section through a pocket.

FIG. 14 is a cross section of the blade (63). (60) is the pocket. The pocket (60) is a depression in the outer curvature of the blade. (61) is the base of the pocket. (62) is the hole or aperture for the bighead (which in this case is the "coupling member") to extend inwards towards the shaft, on the way attaching to a fastening member. Note that the area surrounding the bighead hole has the equivalent thickness of the blade and is smooth and continuous with the rest of the blade. (64) is the flange portion between the blade (63) and the base (65). It is noteworthy that the angle of the blade (63) resumes its curve after the intervening pocket.

Figure 16:
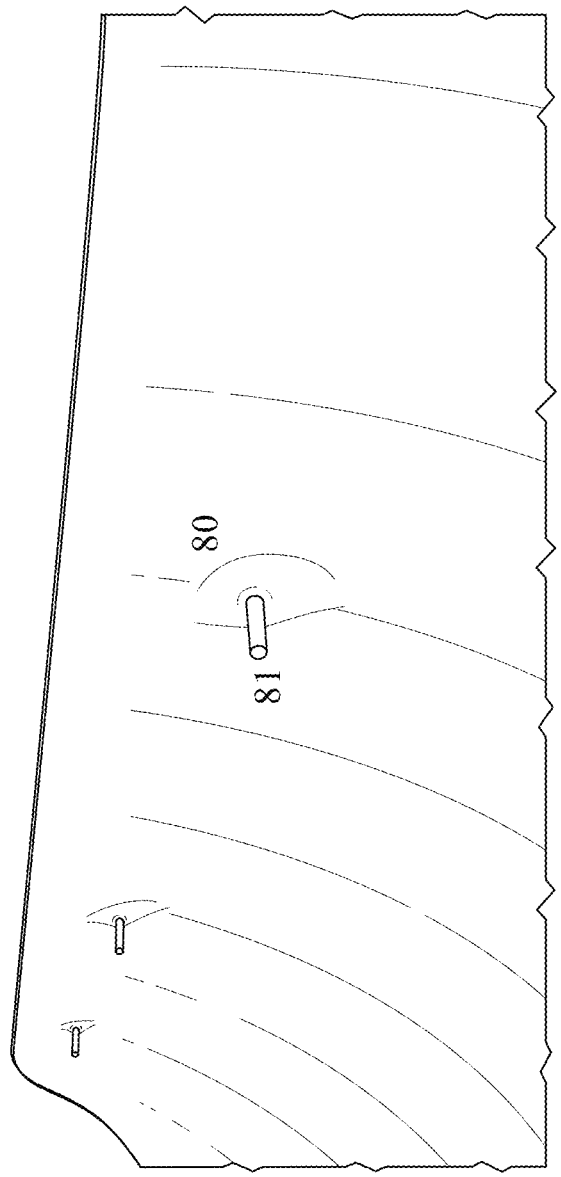
FIG. 16 is a diagram of the bigheads inserted according to the current invention.

FIG. 16 shows the invention in a fiberglass blade where the flange portion protrudes from the inner surface of the curved object and wherein said flat portion extends outside said inner surface. (81) is the shaft of the bighead. (80) is the protrusion of the flange portion. In FIG. 16, the base of the bighead is not seen because it is buried in the pocket and covered by the flange portion. (80) is the same as FIG. 13, (56). There are important comparisons to prior art FIG. 3. The new art in FIG. 16 is much less obtrusive, much stronger, and smoother aerodynamically.

While the invention has been described with respect to a limited number of embodiments, it will be appreciated that many variations, modifications, and other applications of the invention may be made.

What is claimed:

1. A coupling system for coupling a curved object to a central shaft, the curved object includes an inner surface facing the central shaft and an outer surface facing the opposite direction, the system comprising:
    a coupling member for coupling the curved object to the central shaft;
    at least one pocket integrally formed on a curved surface of the curved object and defined as a depression with respect to at least one of the inner and outer surfaces, said pocket includes:
        a flat portion having an aperture for holding said coupling member; and
        a flange portion which merges continuously from the flat portion to the curved object and is shaped such that said flat portion is disposed perpendicularly to the coupling member;
        a fastening member for fastening said coupling member to said flat portion;
    wherein the thickness of the flat portion and the flange portion is the thickness of the curved object; and,
    wherein said flat portion extends between a first end, which protrudes out of the outer surface away from the central shaft, and a second end which protrudes out of the inner surface towards the central shaft.

2. The system of claim 1, wherein the coupling member is a rod coupled on a first end thereof to the central shaft and on a second end thereof to the curved object.

3. The system of claim 1, wherein the fastening member includes a bolt member disposed in said aperture, and wherein the coupling member includes a rod coupled on a first end thereof to the central shaft and on a second end thereof to the bolt member.

4. The system of claim 1, wherein the fastening member includes a least one washer and a nut and wherein the flat portion is configured to allow said washer and said nut to rest on the flat portion.

5. The system of claim 1, wherein the curved object is a wind turbine blade, and wherein the central shaft is configured to be rotated by the wind turbine blade.

6. The system of claim 1, wherein a first nubbin of the flange portion protrudes from the outer surface of the curved object and a second nubbin of the flange portion protrudes from the inner surface of the curved object.

7. The system of claim 6, wherein a first section of the flange portion includes a curvature which includes aerodynamic properties configured to conform with the aerodynamic properties of said curved surface.

8. The system of claim 7, wherein the first section of the flange portion includes a curvature which is configured with a smooth transition with respect to curvature of said curved surface.

9. A wind turbine blade for coupling to a central shaft with a plurality of coupling members, the wind turbine blade comprising:
- an inner surface facing the central shaft and an outer surface facing the opposite direction;
- a plurality of pockets integrally formed on a curved surface of the blade and defined as a depression with respect to at least one of the inner and outer surfaces, and being configured for holding one of said coupling members, said pocket includes:
  - a flat portion having an aperture for holding one of said coupling members; and
  - a flange portion which couples the flat portion to the curved surface and is shaped such that said flat portion is disposed perpendicular to the coupling member;
- a fastening member for fastening said coupling member to said flat portion;
- wherein the thickness of the flat portion and the flange portion is at least the thickness of the curved object; and
- wherein said flat portion extends between a first end, which protrudes out of the outer surface away from the central shaft, and a second end which protrudes out of the inner surface towards the central shaft.

\* \* \* \* \*